Patented Jan. 1, 1929.

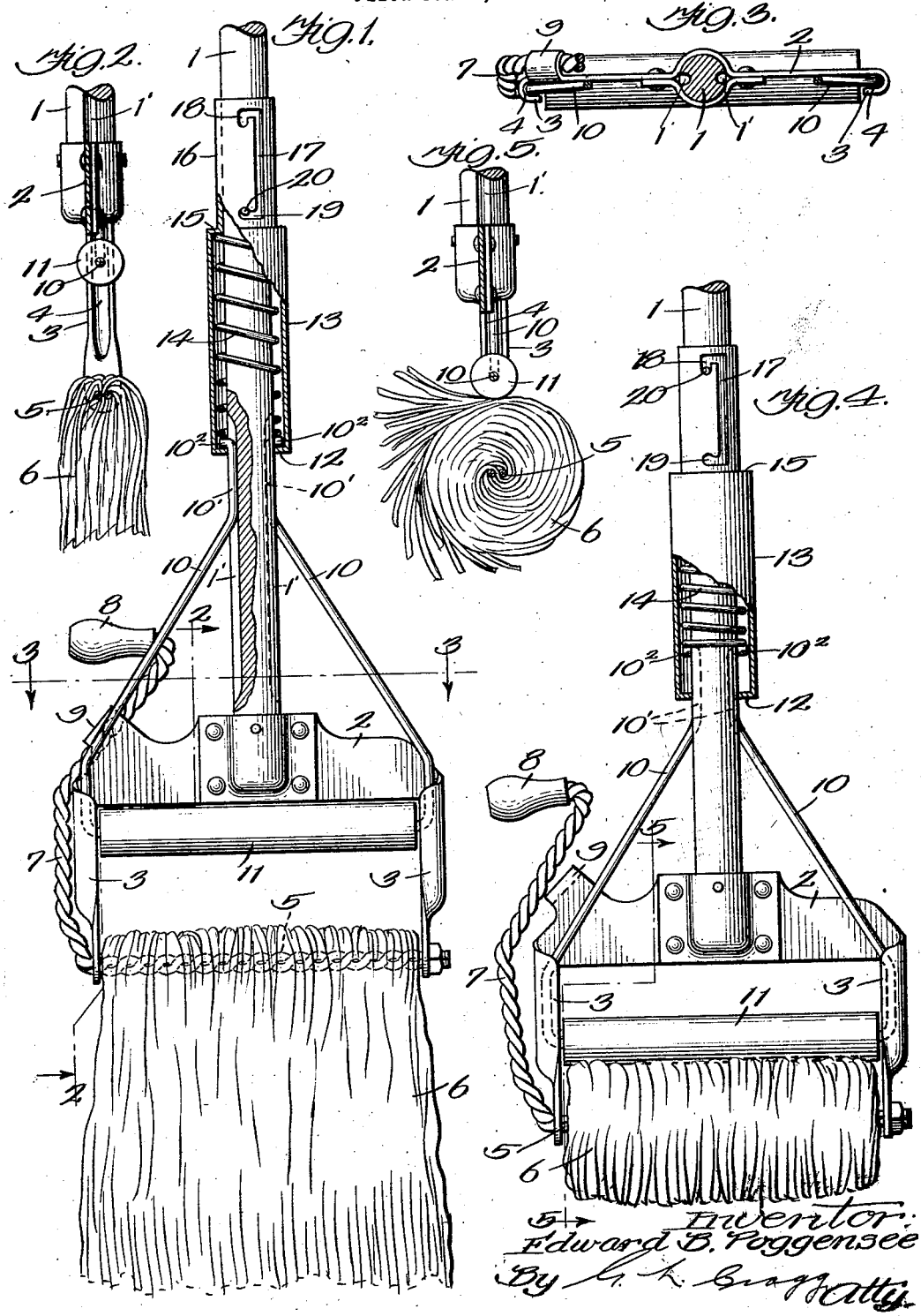

1,697,476

UNITED STATES PATENT OFFICE.

EDWARD B. POGGENSEE, OF CHICAGO, ILLINOIS.

MOP.

Application filed January 9, 1928. Serial No. 245,399.

My invention relates to mops and has for one of its objects the provision of means added to a mop whereby the wiping element of the mop may be wrung without having to be passed through an extraneous wringer. The invention has for another of its objects the provision of means whereby the wiping element of the mop may be shortened, as desired.

In the mop of my invention there is a spool to which the wiping element of the mop is secured. A crank is provided for turning the spool, the spool being caused to act as one wringing element or roller, there being added another wringing element or roller with which the spool may cooperate in the wringing operation. The spool also may be turned while not cooperating with the wringing element in order to modify the effective length of the wiping element of the mop.

The invention will be more fully explained in connection with the accompanying drawing in which Fig. 1 is an elevation of a mop constructed in accordance with the preferred embodiment of the invention, portions being broken away and shown in section, the wringing element or roller being withdrawn out of cooperative relation with the spool; Fig. 2 is a sectional view on line 2—2 of Fig. 1; Fig. 3 is a sectional view on line 3—3 of Fig. 1; Fig. 4 is a view somewhat similar to Fig. 3 excepting that the wringing roller is pressed into cooperation with the spool; and Fig. 5 is a sectional view on line 5—5 of Fig. 4.

The handle 1 is the mop handle proper. A bail 2 is fixedly secured to the lower end of said handle. This bail is preferably made of sheet metal which is formed into two parallel branches 3 which are in the plane and extend lengthwise of the handle, these branches being folded to provide two substantially parallel U shaped grooves 4 that extend longitudinally of the handle. A spool or roller 5 is journaled upon the lower ends of the bail sides 3, this spool thus being transverse or crosswise of the handle. This spool is preferably formed of twisted strands of wire between the spirals of which the fiber strands of the wiping element 6 are gripped in the process of twisting said wire strands together. The wire strands are desirably continued upon one side to constitute a crank 7 which may be provided with a handle 8 whereby the spool may be turned in the wringing operation or to shorten the effective length of the wiping element. The base of the bail 2 is formed with a U-shaped clip 9 in which the portion of the crank 7 adjacent the handle 8 may be caught, the crank springing to one side of said clip when uncaught by the clip due to the resilience of the twisted wire of which the crank is made, as shown in Fig. 4, it requiring depression of the crank into said clip against the resilience of the wire when the crank is to be caught and held, Figs. 1 and 3. By suitably turning the spool, the wiping element may be spread out to its full length or it may be shortened as desired, the crank 7 being caught by the clip 9 when the desired adjustment of the wiping element has been effected.

A second bail 10 is provided upon the handle, this second bail carrying a wringing element 11 upon the mid portion thereof that is transverse or crosswise of the handle, this wringing element being preferably in the form of a roller which is journaled upon the second bail. The two bails are relatively adjustable longitudinally of the handle, the bail 10 being itself preferably moved along the handle whereby the wringing roller 11 may be withdrawn from wiping element 6, Fig. 1, or may be pressed into engagement with said wiping element, Fig. 4. The second bail 10 is preferably formed of stiff wire whose end portions 10' extend along the handle and are outwardly deflected, as indicated at $10^2$ to constitute hooks which are engageable with the bottom end wall 12 of the spring barrel 13, which spring barrel is adjustable along the mop handle. The handle 1 is provided with grooves 1' extending lengthwise thereof in which the bail portions 10' may slide and which serve to prevent the bail 10 from turning on the handle whereby the bails 2 and 10 are maintained in the same general plane.

The hooks $10^2$ also serve as abutments for the lower end of a spring 14 located within said spring barrel and spirally wound around the handle 1 that passes through the spring barrel. The spring barrel 13 is reduced in diameter at its upper end to provide an abutment shoulder 15 against which the upper end of said spring presses. The reduced upper continuation 16 of said spring barrel is in snug sliding fit with the handle 1 and is formed with an elongated channel 17 therethrough which extends lengthwise of the handle and which terminates in bayonet branches 18, 19. The handle is provided with a bayonet pin 20 that projects laterally therefrom and which may move in the channel 17 and in the bayonet extensions 18, 19. When the mop has the adjustment illustrated in Fig. 1, the spring 14 is under sufficient compression to hold the hooks 10² against the spring barrel wall 12 with sufficient pressure to maintain the wringing roller 11 in idle position, there then being sufficient space between the wringing roller and the spool 5 to permit the wiping element 6 to be wound up sufficiently to shorten the length of said wiping element to the desired extent. When the mop is to be wrung, the spring barrel 13 is turned to bring the bayonet pin 20 into the channel 17, said spring barrel then being moved downwardly against the force of the spring 14 and subsequently turned to bring the bayonet pin 20 into the bayonet branch 18, Fig. 4. When the mop is adjusted as illustrated in Fig. 4, the wringing roller and spool are pressed against the wiping element 6 and the spring is placed under increased compression whereby said wringing roller and spool are forcibly pressed against said wiping element. If the spool 5 is now turned consequent upon turning the crank handle 8, the wiping element of the mop may be wrung. The spring will be crowded upwardly as the wiping element is being wound upon the spool so that the spring pressure is increased to increase the wringing action or squeezing pressure of the wringing element and spool upon the wiping element.

An important characteristic of my invention resides in holding the wringing roller and the spool for the wiping element in spaced apart relation (Fig. 1), whereby ample freedom is allowed for the movement of the wiping element when the mop is in use.

Changes may be made without departing from the invention.

Having thus described my invention, I claim:

1. In a mop, the combination with a handle; of a bail, formed of sheet metal, which is secured at its intermediate portion to the handle and whose sides are folded to form two substantially parallel grooves that are U shaped in cross section and extend longitudinally of the handle; a spool journaled upon said bail and having the wiping element of the mop secured thereto; a crank on the spool; a second bail carried by the handle and having its sides received and slidable within said grooves; a wringing roller journaled upon the second bail; a spring carried by the handle and pressing upon the second bail to squeeze said wiping element between said spool and wringing roller as said spool is turned; a barrel for said spring and having an abutment engaged by the end of the spring that is more remote from said roller; and means for holding said barrel in different positions along the handle to bring the wringing roller toward or from said spool.

2. In a mop, the combination with a handle; of a bail which is secured at its intermediate portion to the handle; a spool journaled upon said bail and having the wiping element of the mop secured thereto; a crank on the spool; a second bail carried by the handle; a wringing roller journaled upon the second bail; a spring carried by the handle and pressing upon the second bail to squeeze said wiping element between said spool and wringing roller as said spool is turned; a barrel for said spring and having an abutment engaged by the end of the spring that is more remote from said roller; and means for holding said barrel in different positions along the handle to bring the wringing roller toward or from said spool.

In witness whereof, I hereunto subscribe my name.

EDWARD B. POGGENSEE.